United States Patent
Teo et al.

(10) Patent No.: US 8,046,029 B2
(45) Date of Patent: *Oct. 25, 2011

(54) METHOD FOR SELECTING ANTENNAS IN A WIRELESS NETWORKS

(75) Inventors: Koon Hoo Teo, Lexington, MA (US); Neelesh B. Mehta, Secunderabad (IN); Andreas F. Molisch, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 815 days.

This patent is subject to a terminal disclaimer.

(21) Appl. No.: 12/055,522

(22) Filed: Mar. 26, 2008

(65) Prior Publication Data

US 2009/0247229 A1 Oct. 1, 2009

Related U.S. Application Data

(60) Provisional application No. 60/955,749, filed on Aug. 14, 2007.

(51) Int. Cl.
*H04M 1/00* (2006.01)
(52) U.S. Cl. ............ 455/562.1; 370/310; 370/329; 375/133; 375/260
(58) Field of Classification Search ............ 455/562.1; 370/310, 329, 330, 336, 344; 375/133, 260, 375/E1.033
See application file for complete search history.

(56) References Cited

U.S. PATENT DOCUMENTS

2009/0054093 A1* 2/2009 Kim et al. ............ 455/500
2010/0111009 A1* 5/2010 Pajukoski et al. ............ 370/329

OTHER PUBLICATIONS

R1-072340, "Considerations on Sounding Reference Signal for Closed-Loop Antenna Switching in E-UTRA Uplink," TSG-RAN WG1 #49, LG Electronics, May 7, 2007, Kobe, Japan.
R1-063089, "Low Cost Training for Transmit Antenna Selection on the Uplink," Mitsubishi Electric, NTT DoCoMo, 3GPP RAN1#47; Nov. 6-10, 2006; Riga, Latvia.
R1-063690, "Performance Comparison of Training Schemes for Uplink Antenna Selection," Mitsubishi Electric NTT DoCoMo, 3GPP RAN#47; Nov. 6-10, 2006; Riga Latvia.
R1-033091, Effects of the Switching Duration on the Performance of the within TTI Switching Scheme for Transmit Antenna Selection in the Uplink Mitsubishi Electric, NTT DoCoMo, 3GPP RAN1#47; Nov. 6-10, 2006; Riga, Latvia.
R1-070524, "Comparison of Closed Loop Antenna Selection with Open-Loop Transmit Diversity (Antenna Switching Between TTIs)," Mitsubishi Electric, 3GPP RAN1#47bis, Jan. 15-19, 2007, Sorrento, Italy.
R1-073067, "Adaptive Antenna Switching with Low Sounding Reference Signal Overhead," Mitsubishi Electric, 3GPP RAN1#49bis; Jun. 25-29, 2007; Orlando, Florida.

(Continued)

*Primary Examiner* — Tuan H Nguyen
(74) *Attorney, Agent, or Firm* — Dirk Brinkman; Gene Vinokur

(57) ABSTRACT

A method selects antennas in a wireless network including a base station and one or more transceivers. The base station specifies times, subcarriers and subsets of antennas to use to transmit sounding reference signals (SRS) to the base station. Then, the transceiver transmits the SRS according to the specified times and subcarriers using different subsets of the set antennas. The SRS are received in the base station, and the base station selects one of the different subset of the antennas based on the received SRS, and indicates the selected subset of the antennas to the transceiver.

18 Claims, 15 Drawing Sheets

OTHER PUBLICATIONS

R1-073068, "Impact of Sounding Reference Signal Loading on System-Level Performance of Adaptive Antenna Switching," Mitsubishi Electric, 3GPP RAN1#49bis; Jun. 25-29, 2007; Orlando, Florida.
R1-070860, "Closed Loop Antenna Switching in E-UTRA uplink," NTT DoCoMo, Institute for Infocomm Research, Mitsubishi Electric, NEC, Sharp, Toshiba Corporation, 3GPP Ran#48; St. Louis, Missouri, Feb. 12, 2007.
R1-051398, "Transmit Antenna Selection Techniques for Uplink E-UTRA," Institute for Infocomm Research (I2R), Mitsubishi Electric, NTT DoCoMo, 3GPP RAN1#43; Nov. 7-11, 2005; Seoul, South Korea.

* cited by examiner

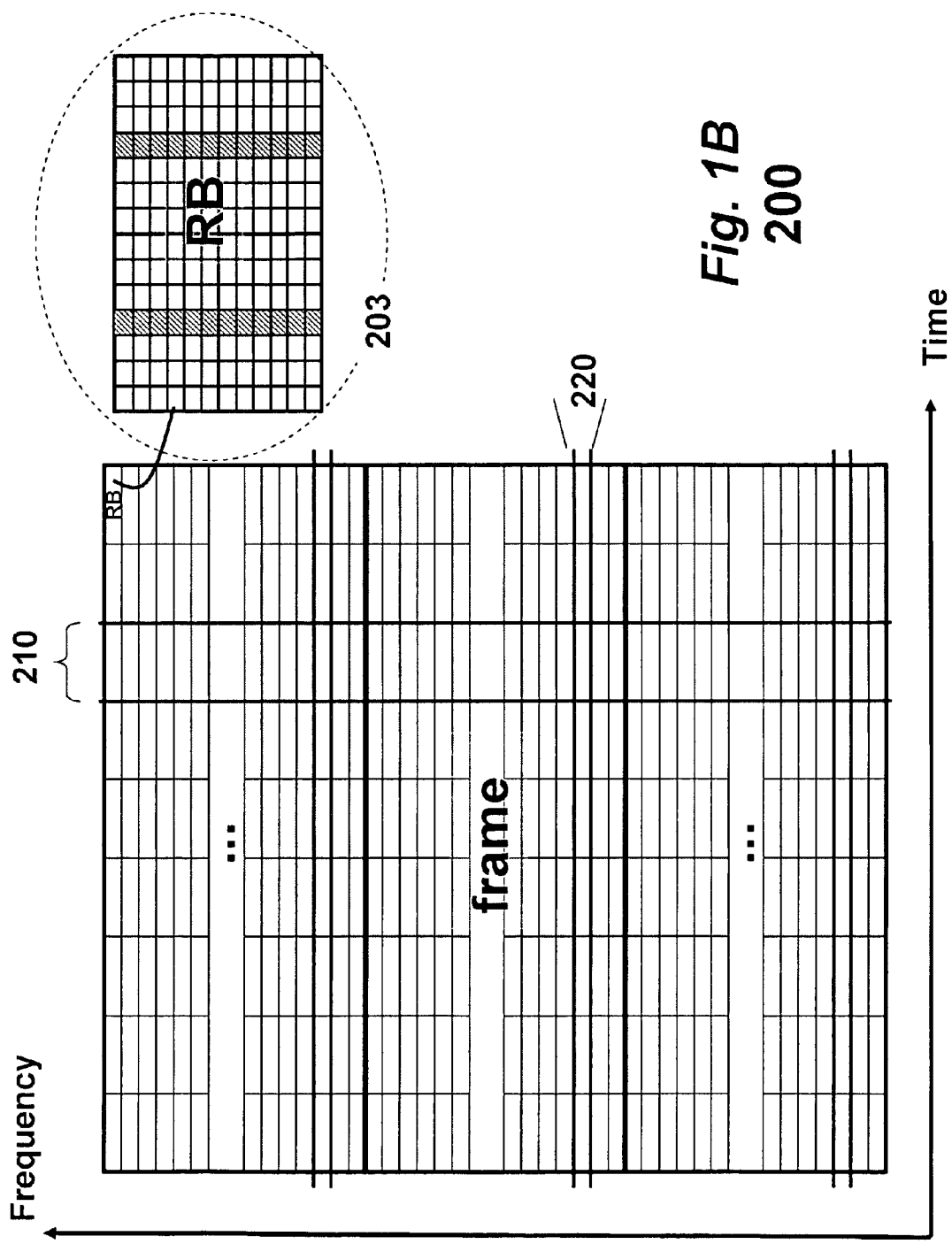

230

METHOD FOR SELECTING ANTENNAS IN A WIRELESS NETWORKS

RELATED APPLICATION

This application claims priority benefit of U.S. Provisional Patent Application No. 60/955,749, entitled "Method for Selecting Frequency-Hopping Antennas in a Wireless Networks Using," filed Aug. 14, 2007, which is incorporated herein by reference.

FIELD OF INVENTION

This invention relates generally to antenna selection in wireless networks, and more particularly to selecting antennas in wireless networks.

BACKGROUND OF THE INVENTION

OFDM

Orthogonal frequency division multiplexing (OFDM) is a multi-carrier communication technique, which employs multiple orthogonal sub-carriers to transmit parallel data streams. Due to the relatively low symbol-rate on each of the sub-carriers, OFDM is robust to severe channel conditions, such as frequency attenuation, narrowband interference, and frequency-selective fading. By prepending a cyclic prefix (CP) in front of each symbol, OFDM can eliminate inter-symbol interference (ISI) when the delay spread of the channel is shorter than the duration of CP. OFDM can also simplify frequency-domain channel equalization because the multiple sub-carriers are orthogonal to each other to eliminate inter-carrier interference (ICI).

OFDMA

When OFDM is combined with a multiple access mechanism, the result is orthogonal frequency division multiplexed access (OFDMA). OFDMA allocates different sub-carriers or groups of sub-carriers to different transceivers (user equipment (UE)). OFDMA exploits both frequency and multi-user diversity gains. OFDMA is included in various wireless communication standards, Such as IEEE 802.16 also known as Wireless MAN. Worldwide Interoperability for Microwave Access (WiMAX) based on 802.16 and the $3^{rd}$ generation partnership project (3GPP) long-term evolution (LTE), which has evolved from Global System for Mobile Communications (GSM), also use OFDMA.

SC-FDMA Structure in LTE Uplink

The basic uplink (UL) transmission scheme in 3GPP LTE is described in 3GPP TR 25.814, v7.1.0, "Physical Layer Aspects for Evolved UTRA," incorporated herein by reference. That structure uses a single-carrier FDMA (SC-FDMA) with cyclic prefix (CP) to achieve uplink inter-user orthogonality and to enable efficient frequency-domain equalization at the receiver side. This allows for a relatively high degree of commonality with the downlink OFDM scheme such that the same parameters, e.g., clock frequency, can be used.

Antenna Selection

The performance of the network can be enhanced by multiple-input-multiple-output (MIMO) antenna technology. MIMO increases network capacity without increasing network bandwidth. MIMO can be used to improve the transmission reliability and to increase the through) put by appropriately utilizing the multiple spatially diverse channels.

While MEMO networks perform well, they may increase the hardware cost, signal processing complexity, power consumption, and component size at the transceivers, which limits the universal application of MIMO technique. In particular, the RF chains of MEMO networks are usually expensive. In addition, the signal processing complexity of some MIMO methods also increases exponentially with the number of antennas.

While the RF chains are complex and expensive, antennas are relatively simple and cheap. Antenna selection (AS) reduces some of the complexity drawbacks associated with MIMO networks. For antenna selection, a subset of an set of the available antennas is adaptively selected by a switch, and only signals for the selected subset of antennas are processed by the available RF chains, R1-063089, "Low cost training for transmit antenna selection on the uplink," Mitsubishi Electric, NTT DoCoMo, 3GPP RAN1#47, R1-063090, "Performance comparison of training schemes for uplink transmit antenna selection," Mitsubishi Electric, NTT DoCoMo, 3GPP RAN1#47, R1-063091, "Effects of the switching duration on the performance of the within TTI switching scheme for transmit antenna selection in the uplink," Mitsubishi Electric, NTT DoCoMo, 3GPP uplink RAN1#47, and R1-051398, "Transmit Antenna Selection Techniques for Uplink E-UTRA," institute for Infocomm Research (I2R), Mitsubishi Electric, NTT DoCoMo, 3GPP RAN1#43, R1-070524, "Comparison of closed-loop antenna selection with open-loop transmit diversity (antenna switching between TTIs)," Mitsubishi Electric, 3GPP RAN1#47bis, R1-073067, "Adaptive antenna switching with low sounding reference signal overhead," Mitsubishi Electric, 3GPP RAN1#49bis, R1-073068, "Impact of sounding reference signal loading on network-level performance of adaptive antenna switching," Mitsubishi Electric, 3GPP RAN1#49bis, all incorporated herein by reference.

Signaling and Protocol Design for Antenna Selection

A signaling format for indicating a selected antenna is described in R1-070860, "Closed loop antenna switching in E-UTRA uplink," NTT DoCoMo, Institute for Infocomm Research, Mitsubishi Electric, NEC, Sharp, Toshiba Corporation, 3GPP RAN1#48, incorporated herein by reference. In order to indicate one antenna out of two possible antennas (A and B), that scheme uses 1 of bit information, either explicitly or implicitly, into an "uplink scheduling grant" message, which indicates the antenna selection decision, 0 means antenna A, and 1 indicates antenna B.

In the prior art, antenna selection is typically performed using pilot signals. Furthermore, antenna selection has been performed only for small-range indoor wireless LANs (802.11n), and where only a single user is on a wideband channel at any one time, which greatly simplifies antenna selection.

In the prior art, sounding reference signals (SRS) and data demodulation (DM) reference signals are only used for frequency dependent scheduling.

A protocol and exact message structure for performing antenna selection for large-range, outdoor OFDMA 3GPP networks is not known at this time. It is desired to provide this protocol and message structure for performing antennas selection for an uplink of an OFDMA 3GPP wireless network.

SUMMARY OF THE INVENTION

The embodiments of the invention provide a method and network for selecting antennas in an uplink of an OFDM wireless networks using sounding reference frames.

A method selects antennas in a wireless network including a base station and one or more transceivers.

The base station specifies times, subcarriers and subsets of antennas to use to transmit sounding reference signals (SRS)

to the base station. Then, the transceiver transmits the SRS according to the specified times, subcarriers and specified subsets of the set antennas. The SRS are received in the base station, and the base station selects one of the subsets of the antennas based on the received SRS, and indicates the selected subset of the antennas to the transceiver.

BRIEF DESCRIPTION OF THE DRAWINGS

FIG. 1B is a block diagram of a frame according to an embodiment of the invention;

DETAILED DESCRIPTION OF THE INVENTION

LTE Network Overview

Figure 1A:
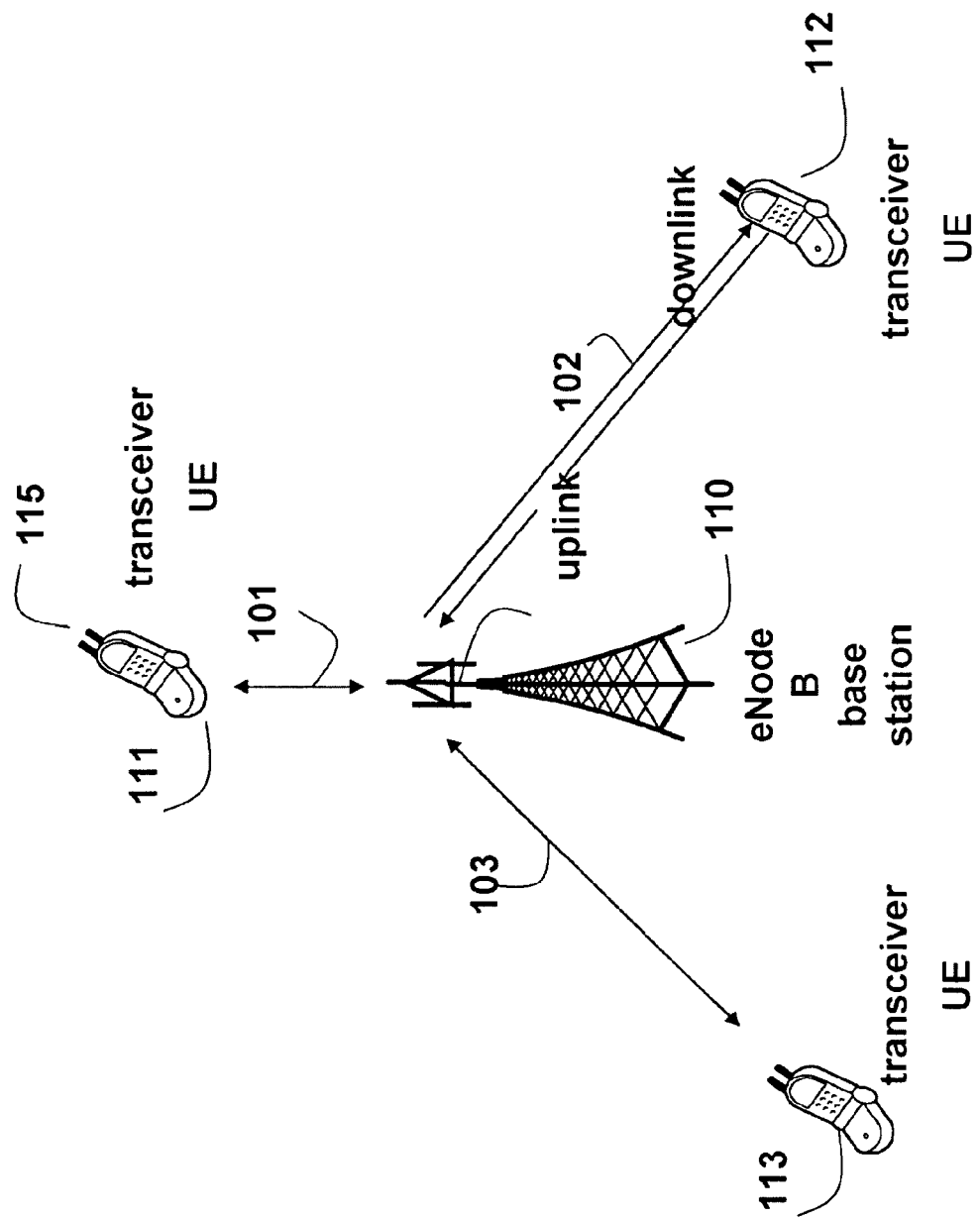
FIG. 1A is a block diagram of a wireless network according to an embodiment of the invention.

FIG. 1 shows the general structure of an OFDMA 3GPP LTE wireless network according to an embodiment of the invention. Multiple user equipments (UEs) or transceivers 111-113 communicate with a base station 110. It should be understood that the base station also operates as a transceiver. However, hereinafter, reference to transceivers means UE, unless specified otherwise. It should be noted that invention can also be used with SC-FDMA and OFDM networks.

The base station is called an evolved Node B (eNodeB) in the 3GPP LTE standard. The eNodeB 110 manages and coordinates all communications with the transceivers in a cell using connections 101, 102, 103. Each connection can operate as a downlink from the base station to the UE or an uplink from the UE to the base station. Because the transmission power available at the base station is orders of magnitude greater than the transmission power at the UE, the performance on the uplink is much more critical.

To perform wireless communication, both the eNodeB and the transceivers are equipped with at least one RF chain and one antenna. Normally, the number of antennas and the number RF chains are equal at the eNodeB. The number of antennas at the base station can be quite large, e.g., dozens. However, due to the limitation on cost, size, and power consumption UE transceivers usually have less RF chains than antennas 115. The number of antennas available at the UE is relatively small, e.g., two or four, when compared with the base station. Therefore, antenna selection as described is applied at the transceivers. However, the base station can also perform the antenna selection as described herein.

Generally, antennas selection selects a subset of antennas from a set of available antennas at the transceivers.

LTE Frame Structure

FIG. 1B shows the basic structure of a 10 ms frame 200 according to an embodiment of the invention. The horizontal axis indicates time and the vertical axis indicates frequency. The frame includes ten 1 ms sub-frames 210 in the time domain. The frame is also partitioned into frequency bands or subcarriers 220, e.g. fifty. The number of bands depends on the total bandwidth of the channels, which can be in the ranges of several mega Hertz. Each sub-frame/band constitutes a resource block, see inset 230 and FIG. 2C for details.

Figure 4:
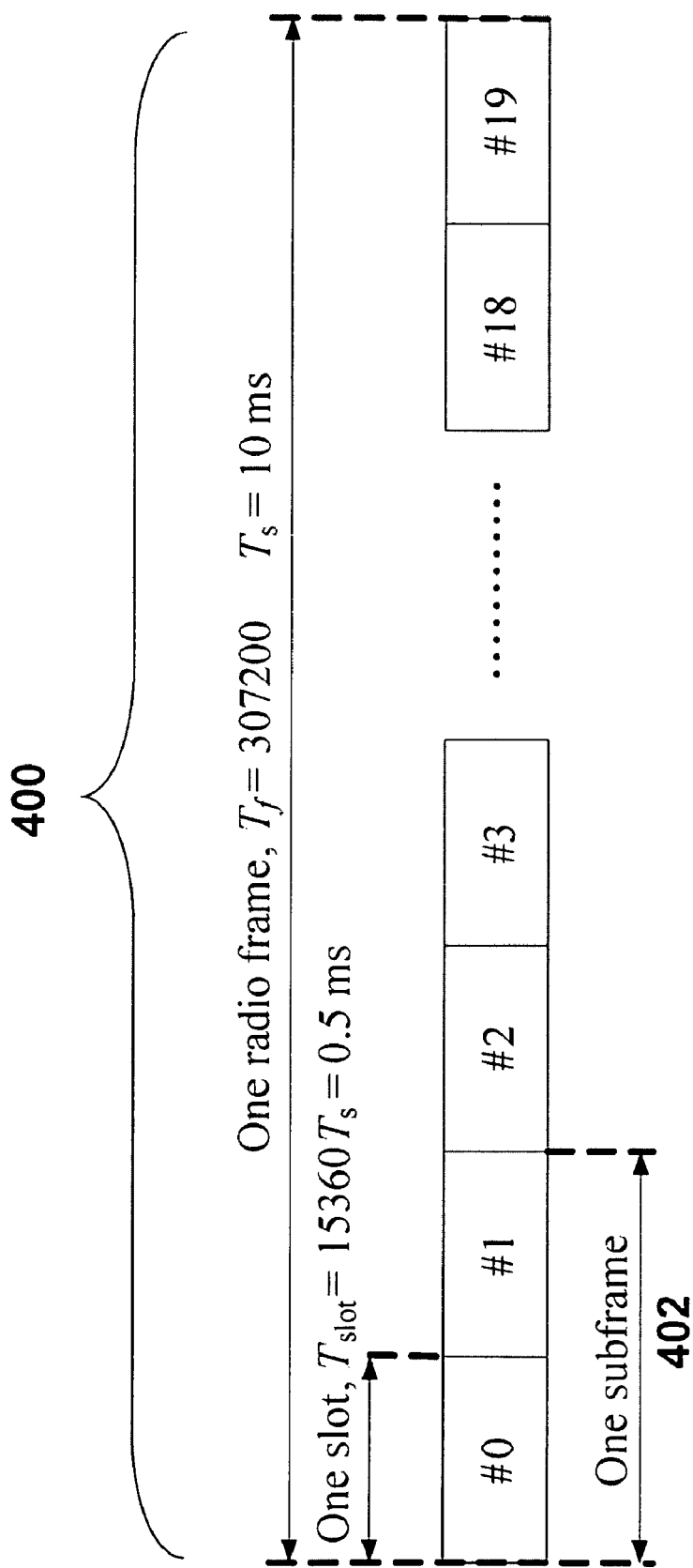
FIG. 4 is a block diagram of a radio frame according to an embodiment of the invention.

As shown in FIG. 4, each radio frame 400 is $T_f$ seconds long, and includes twenty slots 401 of length 0.5 ms, numbered from 0 to 19. A subframe 402 includes two consecutive slots, starting from an even numbered slot. For Frequency Division Duplex (FDD), ten subframes are available for downlink transmission, and ten subframes are available for uplink transmissions in each 10 ms interval. Uplink and downlink transmissions are separated in the frequency domain.

Figure 5:
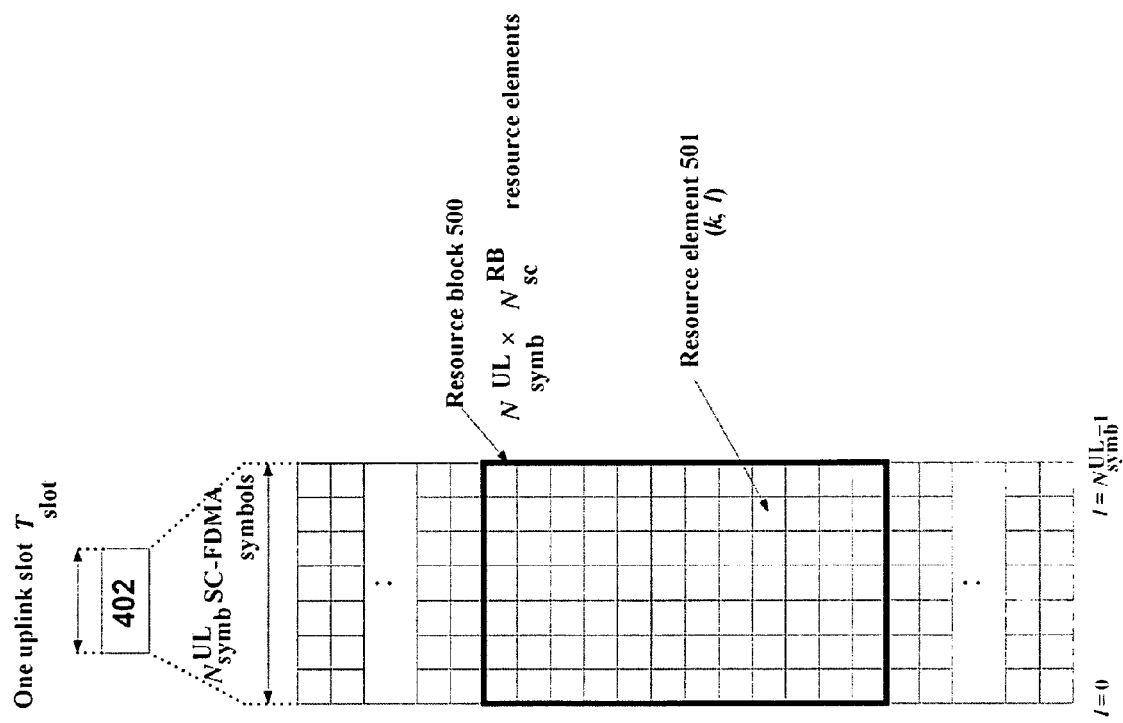
FIG. 5 is block diagram of a resource grid according to an embodiment of the invention.

FIG. 5 shows the transmitted signal in each slot 401. The slot is in the forma6 of a resource block 500. In the block, groups of contiguous subcarriers are indicated along the vertical axis, and symbols over time along the horizontal axis. There are $N_{RB}^{UL} N_{sc}^{RB}$ subcarriers and $N_{symb}^{UL}$ SC-FDMA symbols. Thus, the block includes (k, l) resource elements 501. The quantity $N_{RB}^{UL}$ depends on the uplink transmission bandwidth configured in the cell and lies between 6 and 110. The set of allowed values for $N_{RB}^{UL}$ is given by 3GPP TS 36.104, "Evolved Universal Terrestrial Radio Access (E-UTRA) Base Station (BS) radio transmission and reception," incorporated herein by reference. The number of SC-FDMA symbols in a slot depends on the cyclic prefix length configured by higher layers.

Reference Signals

Two types of uplink reference signals are supported: demodulation reference signal, associated with transmission of physical uplink shared channel (PUSCH) or physical uplink control channel (PUCCH); and sounding reference signal, not associated with transmission of PUSCH or PUCCH. The same set of Zadoff-Chu base sequences is used for demodulation and sounding reference signals.

The generation of the reference signal sequence for both the types of reference signals is as given in TS 36.104.

Mapping to Physical Resources of SRS

A sequence $r^{SRS}(0), \ldots, r^{SRS}(M_{sc}^{RS}-1)$ is multiplied with the amplitude scaling factor $\beta_{SRS}$, and mapped in sequence starting with $r^{SRS}(0)$ to resource elements (k,l) 501 according to $$a_{2k+k_0, l} = \begin{cases} \beta_{SRS} r^{SRS}(k) & k = 0, 1, \ldots, M_{sc}^{RS} - 1 \\ 0 & \text{otherwise} \end{cases},$$

where $k_0$ is the frequency-domain starting position of the sounding reference signal and $M_{sc}^{RS}$ is the length of the sounding reference signal sequence. The sequence index to use is derived from the PUCCH base sequence index.

SC-FDMA Baseband Signal Generation of Data, DM and SRS Signals

The time-continuous signal $s_l(t)$ in SC-FDMA symbol l in an uplink slot is defined by $$s_l(t) = \sum_{k=-\lfloor N_{RB}^{UL} N_{sc}^{RB}/2 \rfloor}^{\lceil N_{RB}^{UL} N_{sc}^{RB}/2 \rceil - 1} a_{k^{(-)},l} \cdot e^{j 2\pi (k+1/2)\Delta f (t - N_{CP,l} T_s)}, \text{ for}$$

$$0 \leq t < (N_{CP,l} + N) \times T_s, \text{ where}$$

$$k^{(-)} = k + \lfloor N_{RB}^{UL} N_{sc}^{RB}/2 \rfloor, N$$

$$= 2048, \Delta f$$

$$= 15 \text{ kHz and } a_{k,l} \text{ is the content of resource element}(k, l).$$

The SC-FDMA symbols in a slot is transmitted in increasing order of l, starting with l=0, where SC-FDMA symbol l starts at time $$\sum_{l'=0}^{l-1} (N_{CP,l'} + N) T_s$$

within the slot.

Table A lists the values of $N_{CP,l}$ that shall be used. Note that different SC-FDMA symbols within a slot may have different cyclic prefix lengths.

TABLE A 1

SC-FDMA parameters.

| Configuration | Cyclic prefix length $N_{CP,l}$ |
|---|---|
| Normal cyclic prefix | 160 for l = 0 |
| | 144 for l = 1, 2, . . . , 6 |
| Extended cyclic prefix | 512 for l = 0, 1, . . . , 5 |

Figure 6A:
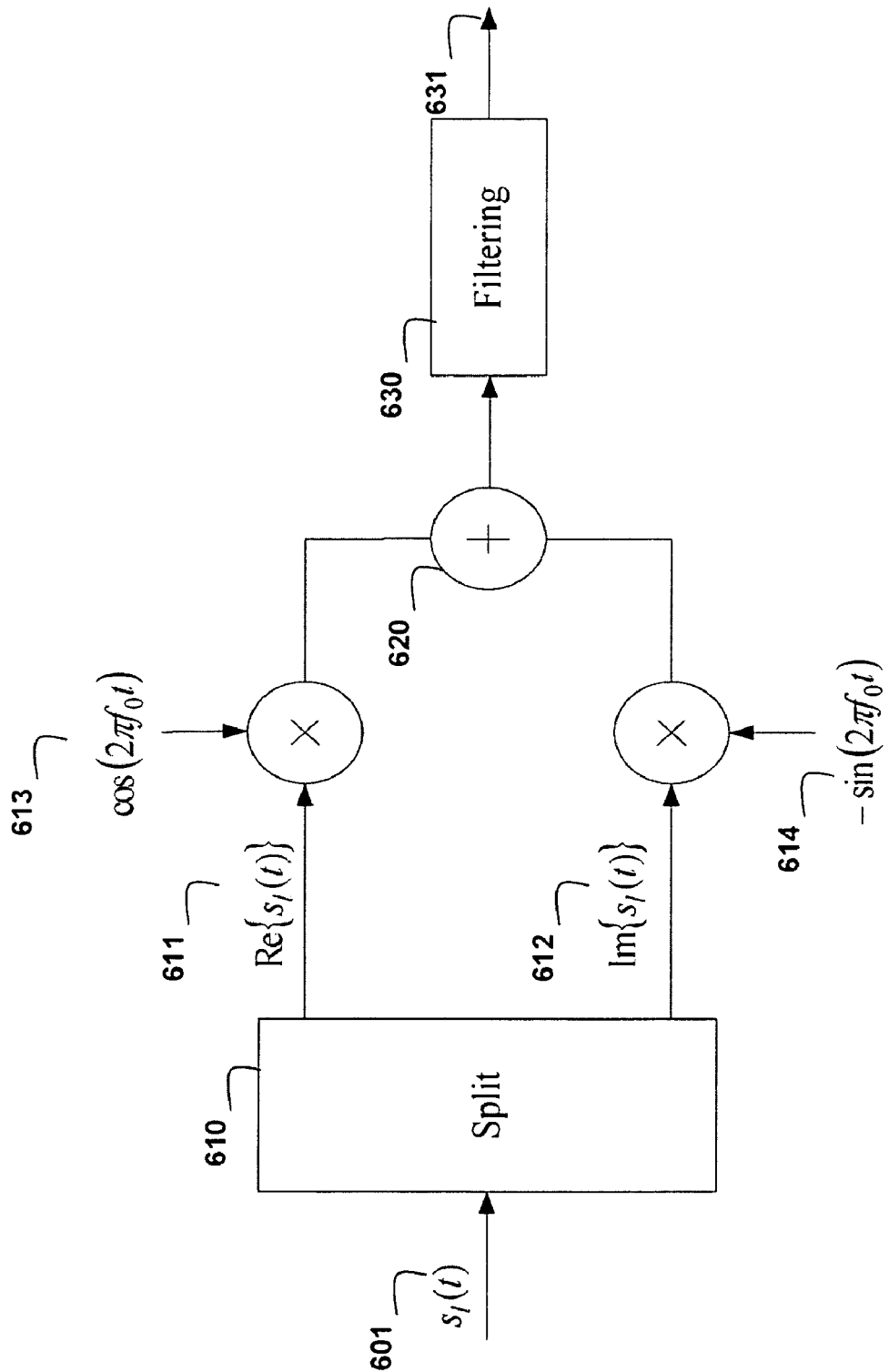
FIG. 6A is a block diagram of a circuit for modulating an uplink signal according to an embodiment of the invention.

Modulation and Upconversion to the Carrier Frequency of the Complex-Valued SC-FDMA Baseband Signal FIG. 6A shows the processing for modulating the uplink signal. An input signal 601 is split 610 into a real part 611 and an imaginary part 612. The real and imaginary parts are modulated by signals 613 and 614 respectively, and then combined 620 and filtered 630 to produce the output signal 631, as defined in TS 36.104.

Figure 6B:
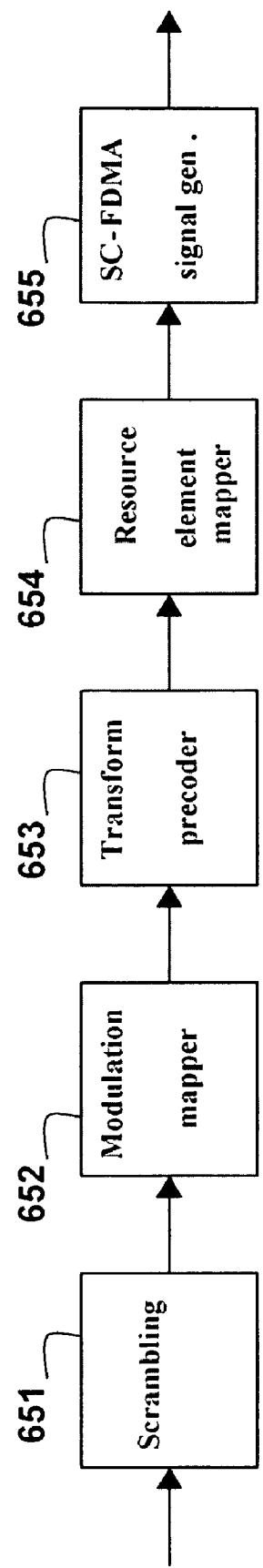
FIG. 6B is a block diagram of a portion of a transmitter according to an embodiment of the invention.

FIG. 6B shows the processing of the baseband signal for the physical uplink shared channel, including scrambling 651, modulation of scrambled bits to generate complex-valued symbols 652, transform preceding to generate complex-valued modulation symbols 653, mapping of complex-valued modulation symbols to resource elements 654, and generation of complex-valued time-domain SC-FDMA signal for each antenna 655.

Method

Figure 1C:
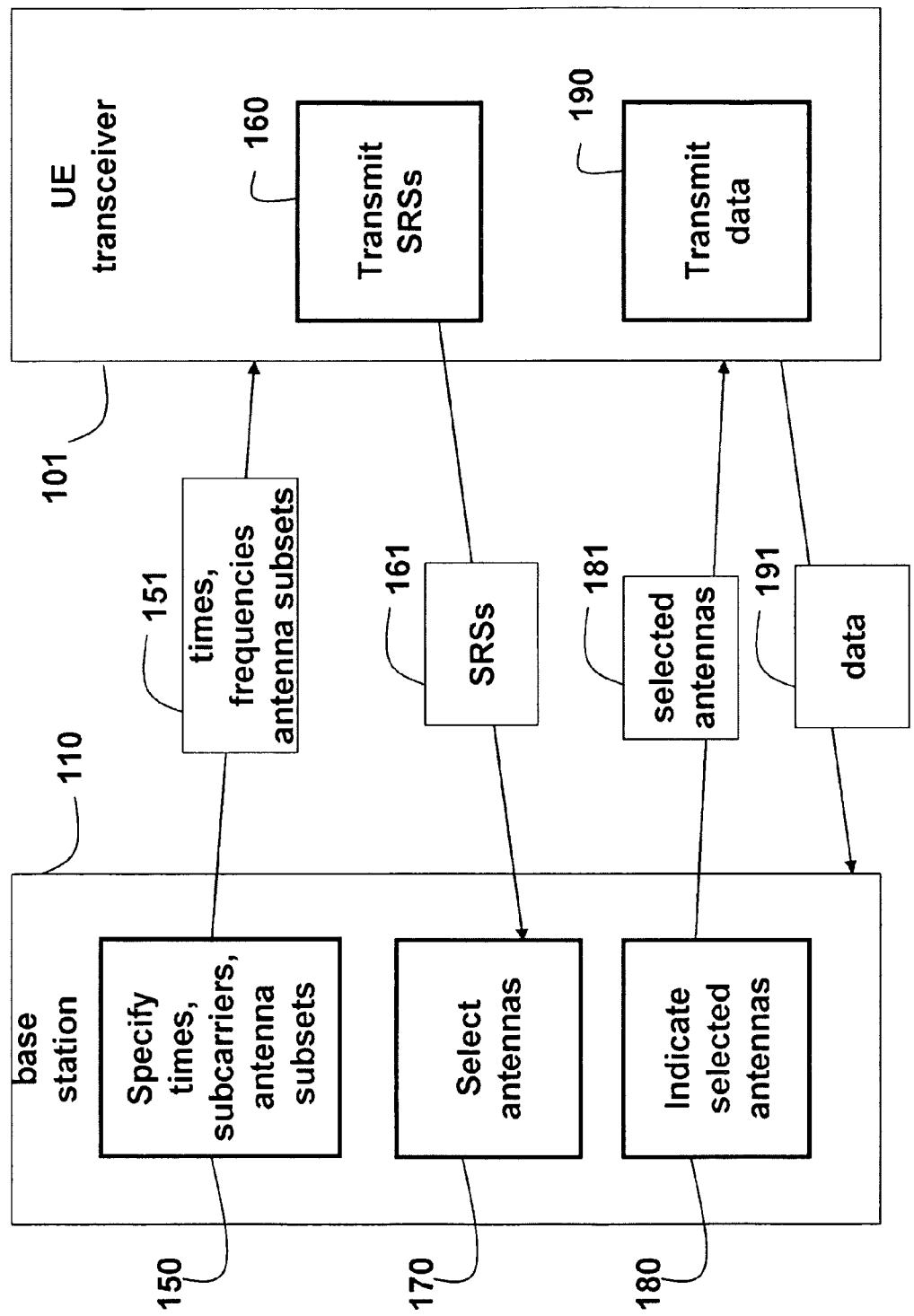
FIG. 1C is a method for selecting antennas according to an embodiment of the invention.

FIG. 1C shows the basic method for antenna selection according to an embodiment of the invention. The base station 110 specifies times, subcarriers and subsets of antennas to use to transmit sounding reference signals (SRSs) 161. The transceiver 101 transmits the SRSs 161 according to the specified times, frequencies, and subsets of the antennas 151

The base station selects 170 a subset of antennas 181 based on the received SRSs 161. The base station then indicates 180 the selected subset of antenna 181 to the transceiver. Subsequently, the transceiver 101 can transmit 190 data 191 using the selected subset of antennas 181. The transceiver can also use the same subset of antennas for receiving data from the base station.

LTE Frame Structure

Figure 2A:
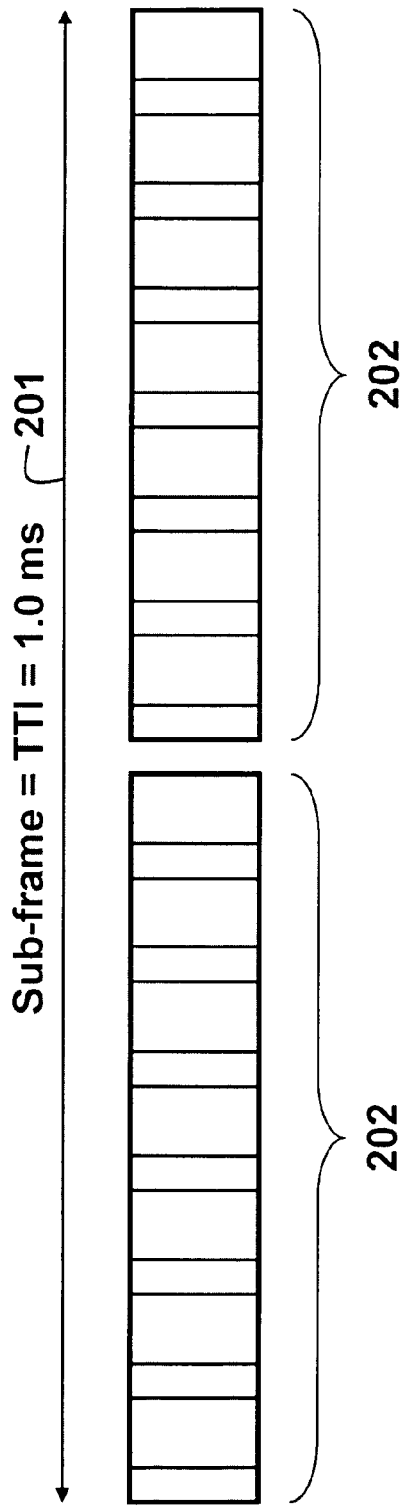
FIG. 2A is a block diagram of sub-frame structure according to an embodiment of the invention.

FIG. 2A shows a general structure of a sub-frame according to an embodiment of the invention. In 3GPP LTE, the transmission time of a frame is partitioned into TTIs (transmission time interval) 201 of duration 1.0 ms. The terms "TTI" and "sub-frame" are used interchangeably. The frame is 10 ms long, which includes 10 TTIs. The TTIs include time-slots 202.

Figure 2B:
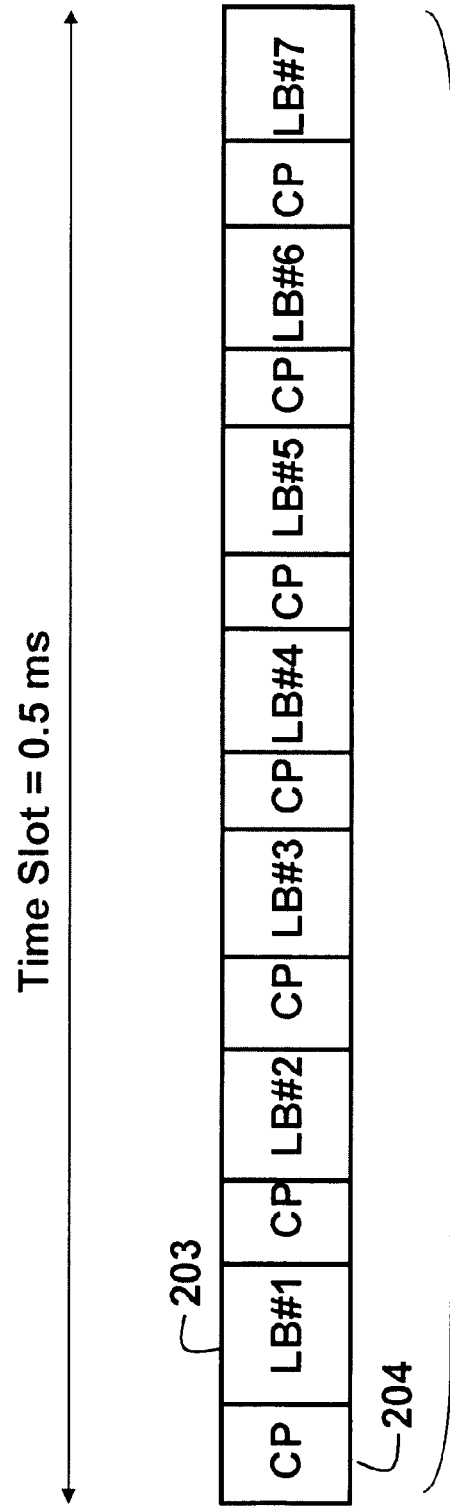
FIG. 2B is a block diagram of time-slot structure according to an embodiment of the invention.

FIG. 2B shows a general structure of a time-slot according to an embodiment of the invention. As described above, the TTI is the basic transmission unit. One TTI includes two equal length time-slots 202 each with a duration of 0.5 ms. The time-slot includes seven long blocks (LB) 203 for symbols. The LBs are separated by cyclic prefixes (CP) 204. In total, one TTI comprises fourteen LB symbols with a normal cyclic prefix. With an extended cyclic prefix, the number of LB symbols decreases to 12. It should be noted that the invention is not limited to a specific frame, sub-frame, or time-slot structure.

Figure 2C:
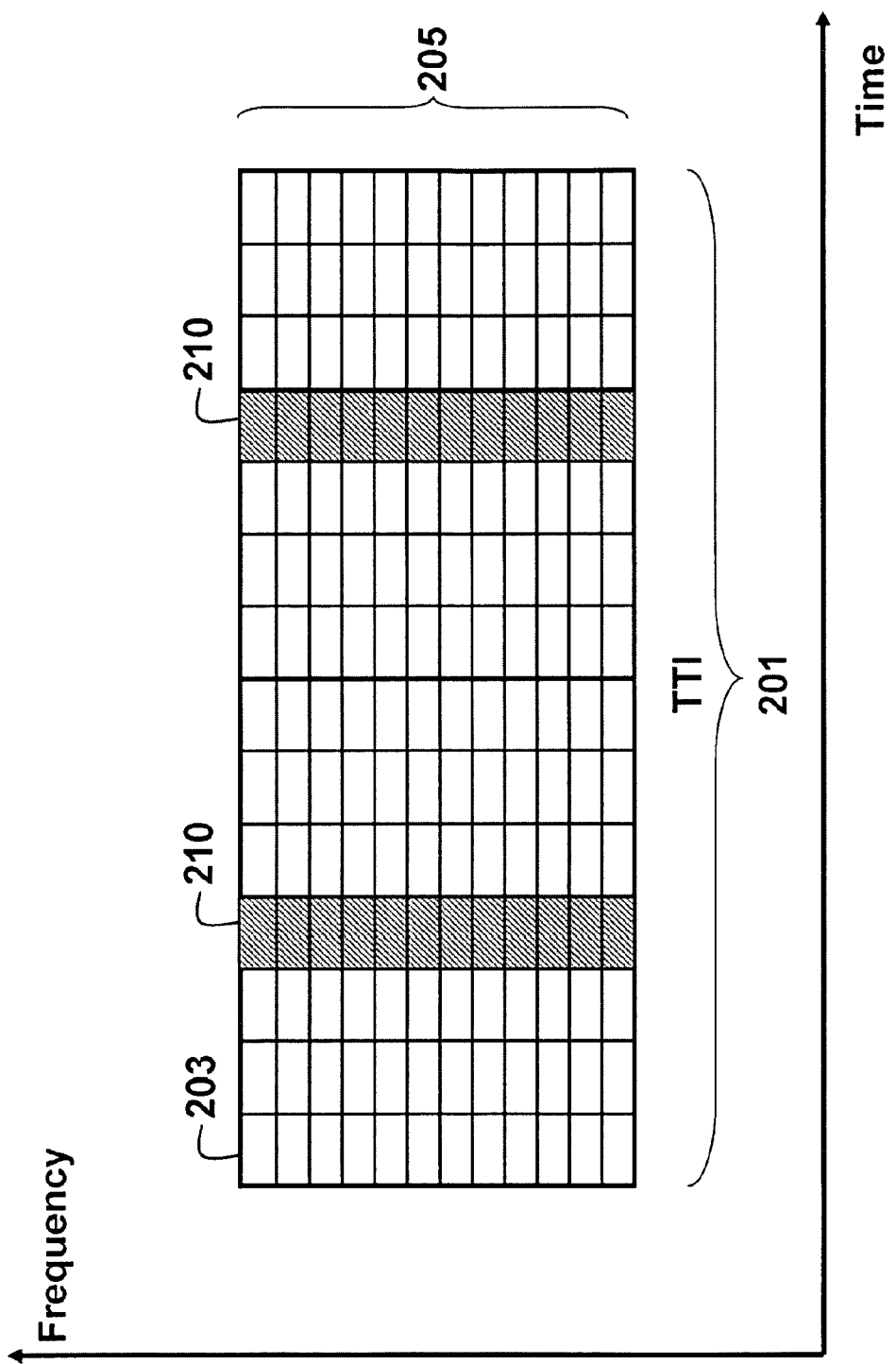
FIG. 2C is a block diagram of a resource block according to an embodiment of the invention.

FIG. 2C shows the details of one resource block (RB) 230 during one TTI 201 according to an embodiment of the invention. The TTI is partitioned, in time, into fourteen LBs 203. Each LB can carry a symbol. The entire network bandwidth, e.g., of 5 MHz or 10 MHz or 20 MHz, is partitioned divided into sub-carriers 205 at different frequencies. Groups of twelve contiguous sub-carriers, as shown, within one TTI are called resource blocks (RBs). For example, 10 MHz of bandwidth within 1 TTI night include fifty RBs in the frequency domain. The two shaded LBs 210, i.e., the $4^{th}$ and the $11^{th}$ LBs, carry data demodulation (DM) reference signals (RS) that are known to the receiver. The DM RS enables the receiver to estimate the channel state of the RBs assigned to the transceiver and coherently demodulate the unknown data carried in the other LBs. That is, in the prior art, DM reference signals are only used for channel estimation prior to data demodulation. For clarity the CPs are not shown in FIG. 2C. It should be noted that the invention is not limited to a specific number of LBs during the TTI or the location of the DM RSs in the TTI. According to one embodiment of the invention, the DM reference signal is also used for antenna selection.

Sounding Reference Signal (SRS)

Except for the $4^{th}$ and the $11^{th}$ LBs, the other LBs are used for transmitting control and data signals, as well as uplink sounding reference signals (SRS). For instance, the first LB can carry the SRS. The SRS is usually a wideband or variable bandwidth signal. The SRS enables the base station to estimate the frequency response of the entire bandwidth available for the network, or only a portion thereof. This information enables the base station to perform resource allocation such as uplink frequency-domain scheduling.

According to the embodiment of the invention, the SRSs are also used for antenna selection.

Another option for 3GPP LTE is to use a frequency-hopping (FH) pattern to transmit the SRS. Specifically, a hopping SRS, with a bandwidth smaller than the network bandwidth, is transmitted based on a pre-determined frequency hopping pattern. The hopped SRSs, over multiple transmissions, span a large portion of the entire bandwidth available for the network, even the entire available bandwidth. With frequency hopping, the probability that transceivers interfere with each other during sounding is decreased.

As stated above, adaptive antenna switching on the uplink exploits the diversity offered by multiple antennas that are present in the UE. Using the broadband sounding reference signal (SRS) for antenna selection has the advantage of facilitating joint frequency-domain scheduling (FS) and antenna selection (AS).

It should be noted that the SRS need not occupy the entire network bandwidth. Instead, the eNodeB can direct the UE to transmit either a variable bandwidth SRS to sound only a portion of the entire network bandwidth or a frequency-hopped SRS that would, over multiple hops, sound the entire network bandwidth.

However, if performed incorrectly, antenna selection with a frequency-hopped variable bandwidth sounding reference signal results in limited performance improvement, particularly if the UE is mobile and moving rapidly. Therefore, we provide techniques that offset degradation in network performance due to frequency hopping of the SRS at high Doppler shifts.

Frequency-Hopped SRS

In a frequency-hopped SRS, the available bandwidth of B Hz is partitioned into $N_f$ subbands of bandwidth $$\frac{B}{N_j}$$

Figure 3A:
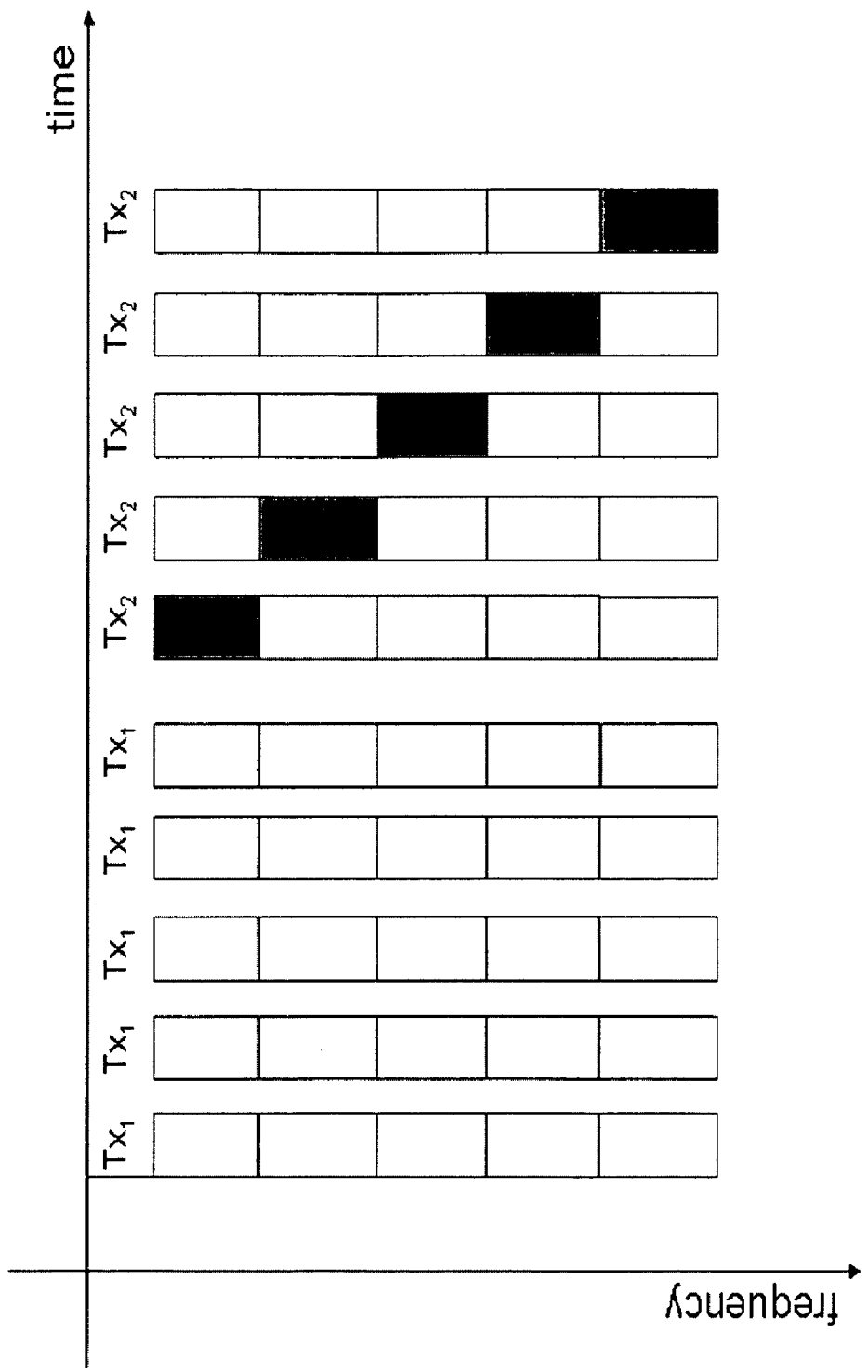
FIGS. 3A and 3B are block diagram frequency hopping during antenna selection according to an embodiment of the invention.

Hz each. FIG. 3A shows a frequency lopping pattern for the SRS for $N_f=5$ considered in "Considerations on sounding reference signal for closed-loop antenna switching in E-UTRA uplink," LG Electronics, May 7, 2007, incorporated herein by reference. All the subbands of antenna $TX_1$ are successively sounded by a frequency-hopped SRS. Thereafter, the subbands of antenna $TX_2$ are successively sounded in a similar manner, as shown by the shaded blocks.

Figure 3B:
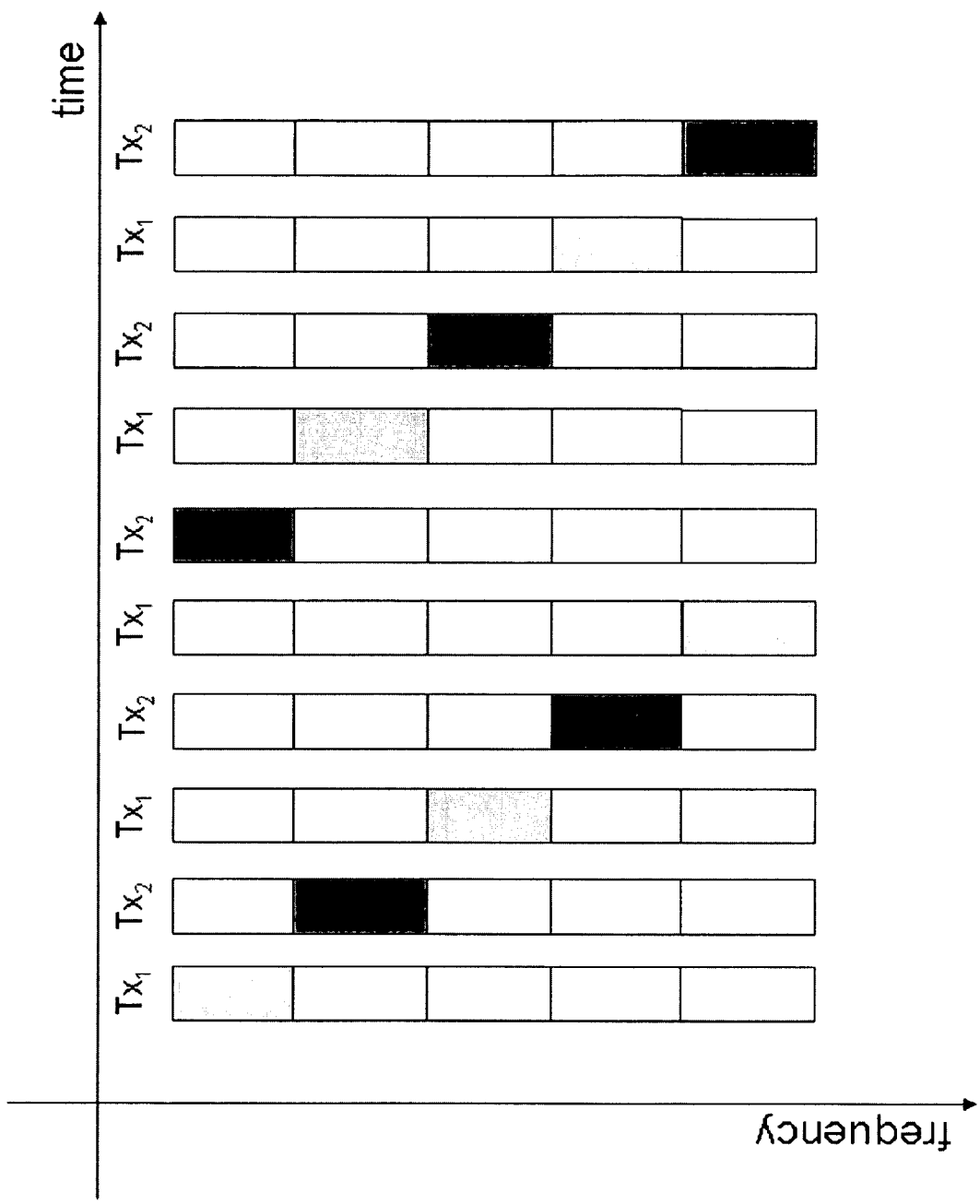

FIG. 3B shows an alternate frequency lopping scheme for the SRS for $N_f=5$. Two antennas $TX_1$ and $TX_2$ are alternately sounded resulting in time-interleaved frequency hopping pattern.

While the above two schemes alternate between the two antennas, the schemes described below provide an additional flexibility in how the SRS can be transmitted.

Figure 7A:
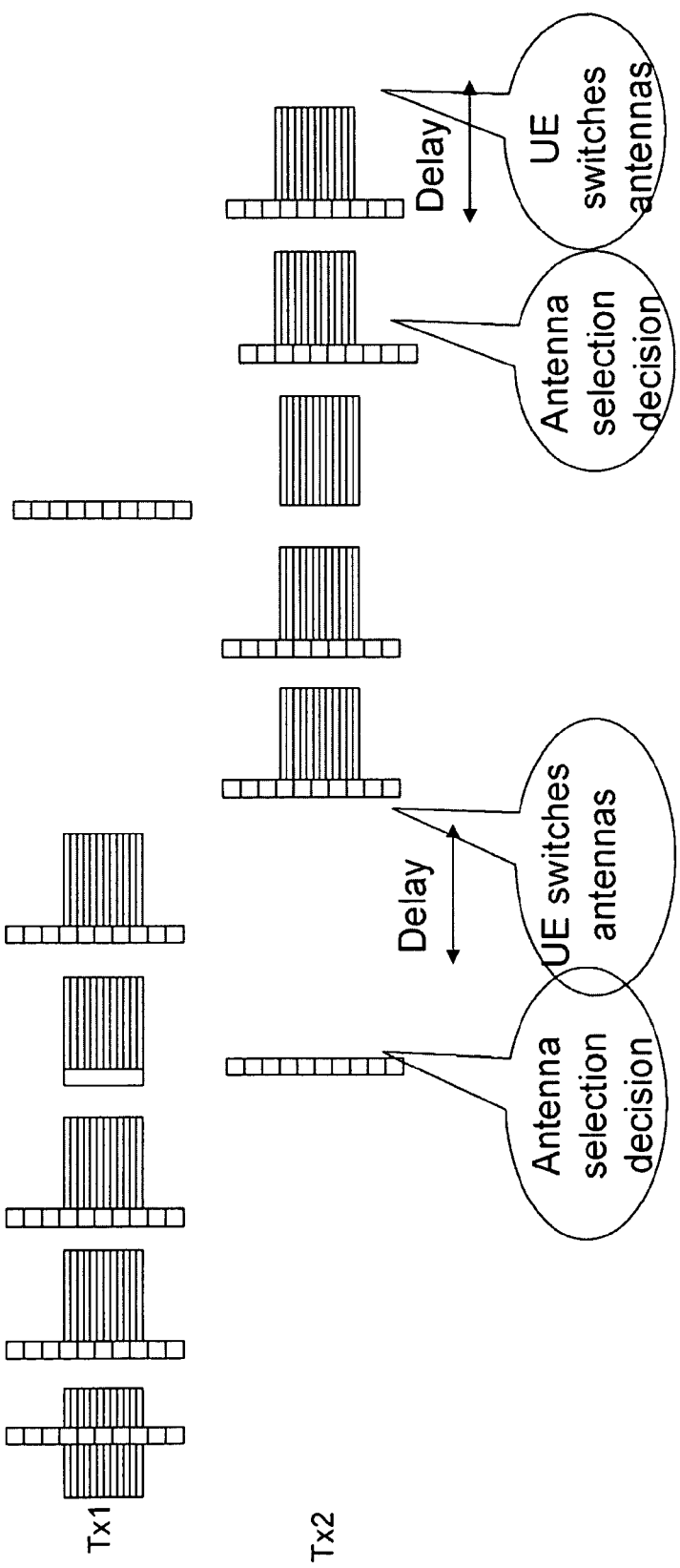
FIGS. 7A-B are block diagrams of asymmetric antenna sounding without frequency hopping using sounding reference signals according to an embodiment of the invention.
Figure 7B:
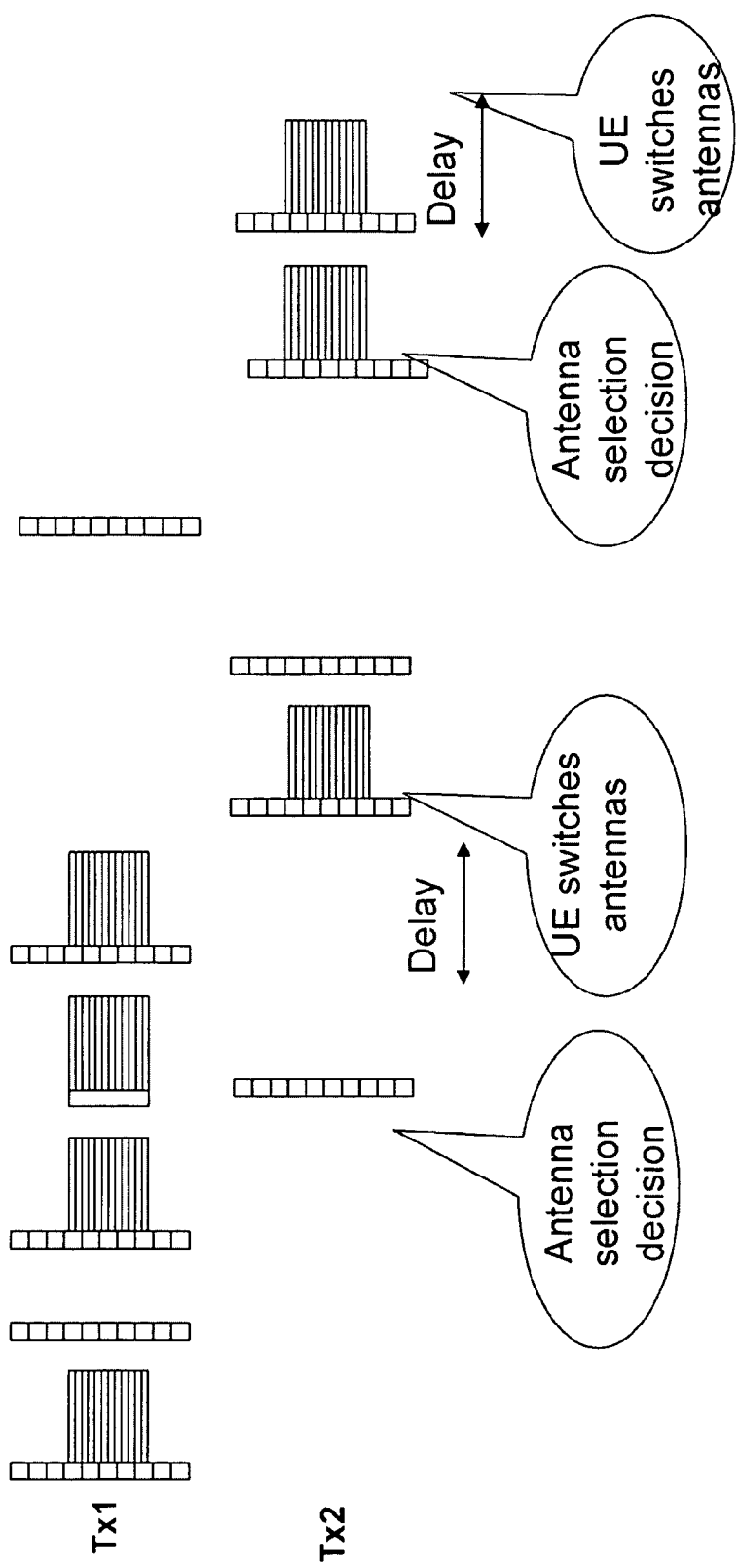

First consider the case in which the SRS is transmitted periodically, but without frequency hopping, as shown in FIGS. 7A and 7B. One or more of in every k sounding SRSs is transmitted from the unselected antenna, and the rest of the SRSs are transmitted from the selected antenna, where k is greater than 1, for example, five, ten or fifteen.

In FIGS. 7A and 7B, k is 4. In other words, the base station tells the UE that it is to transmit the SRS using the selected antenna 3 out of every 4 SRS transmissions and using the unselected antenna 1 out of every 4 SRS transmissions. Furthermore, the base station uses the selected and unselected terminology to communicate its decision to the UE, as per an embodiment of this invention. For example, the base station can transmit an explicit control bit set to 1 to indicate that the UE should use the selected antenna, and a control bit set to 0 to indicate that the UE should switch to the unselected antenna for data transmission henceforth. The control bit may be communicated by the base station implicitly.

Here we used the 'selected' and 'unselected' indexing as an indication to select particular subset of the antennas by the transceiver. Thus, we distinguish between the selected antenna that has most recently been selected by the eNodeB for data transmission and the other unselected antenna. The optimal parameter value for k depends on the UE speed, the Doppler spread of the uplink wireless channel, scheduling constraints of the eNodeB, interference environment, etc.

As before, the eNodeB performs resource block assignment and decides which antenna the UE should use for data transmission. The physical layer parameter k is configured by higher layers of the protocol stack, and is known to the eNodeB and the UE a priori. It is communicated by the eNodeB to the UE by RRC parameters, as per an embodiment of this invention, along with other SRS parameters.

When the sounding RS is sent alternately between the selected and unselected antennas subsets, the parameter k can be interpreted to have a value of 2.

Figure 8A:
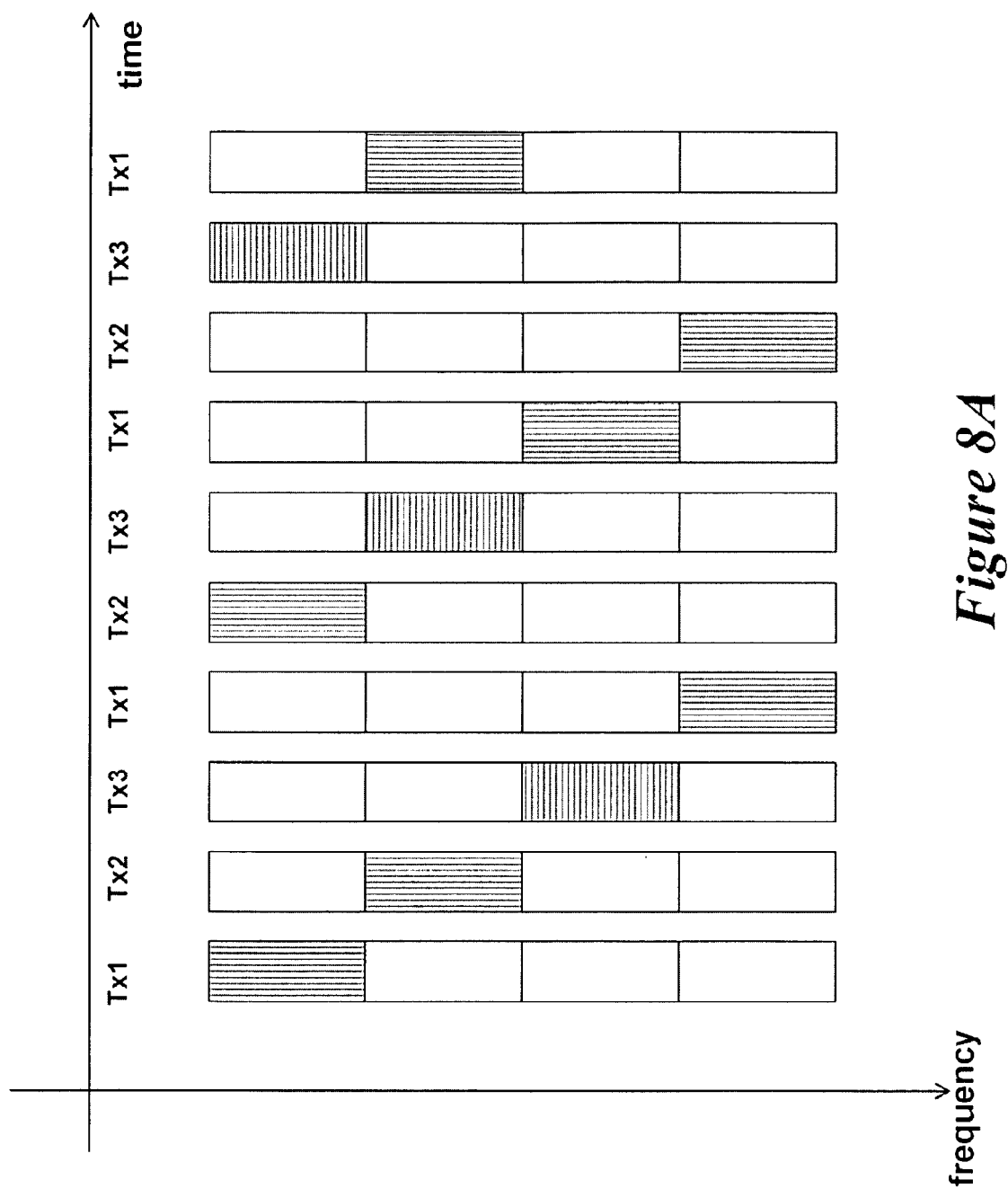
FIG. 8A is a block diagram of asymmetric antenna sounding with a frequency hopping pattern according to an embodiment of the invention.
Figure 8B:
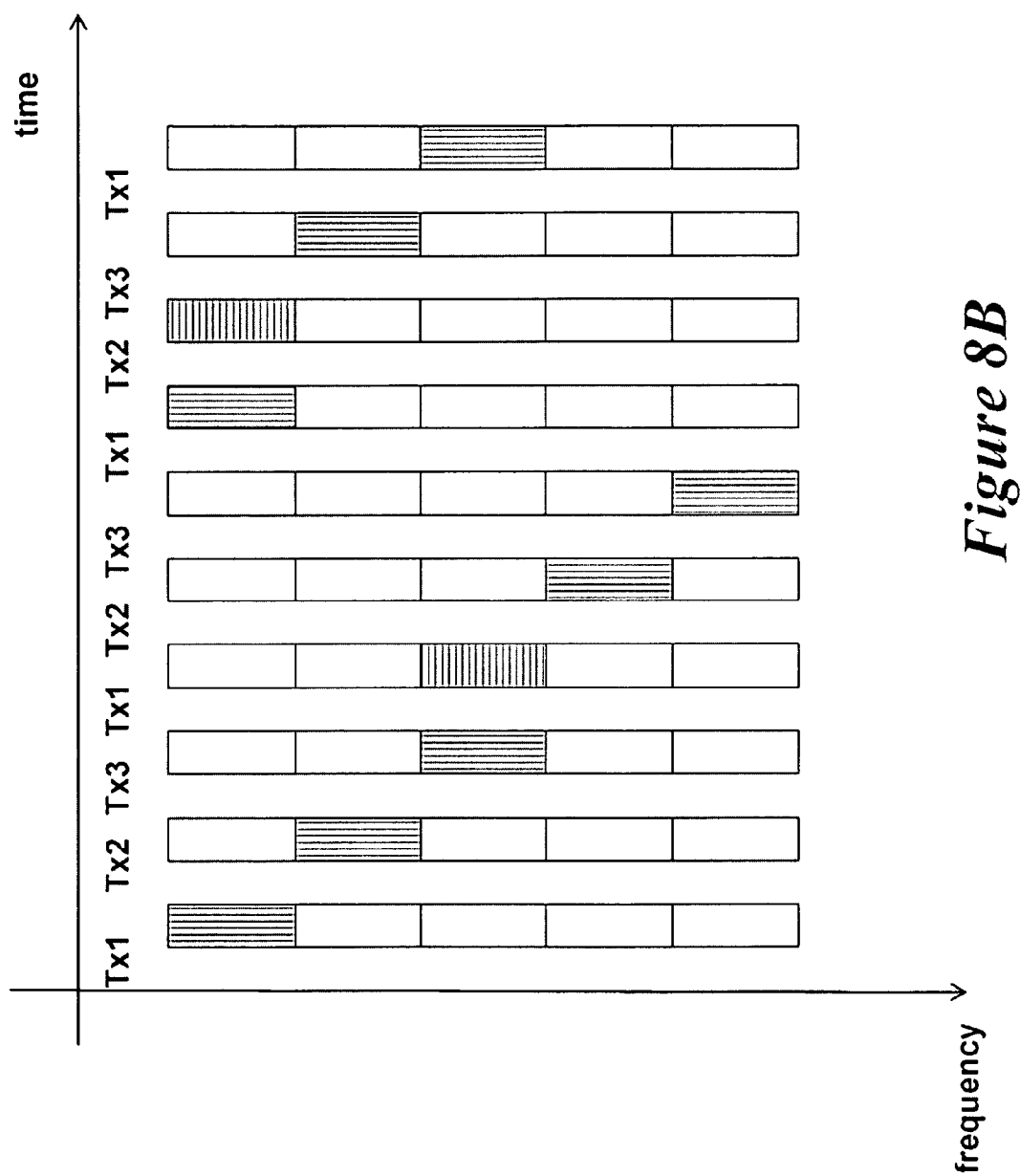
FIG. 8B is a block diagram of asymmetric antenna sounding with repeated transmissions.

The asymmetric transmission of SRS by the selected and unselected antenna can be generalized to include frequency hopping, as per an embodiment of this invention. This is shown in FIGS. 8A and 8B. FIG. 8A illustrates that the unselected antenna transmission is part of the hopping pattern. FIG. 8B illustrates another option where both the UE antennas sound specified subband(s). The base station can adjust and select the frequency hopping pattern, for example, to produce maximum frequency wide coverage in a minimum amount of time.

At high Doppler spreads ($f_d=30$) Hz and for $N_f=5$, the antenna selection of FIG. 3A results in limited performance gains, see R1-072340, "Considerations on sounding reference signal for closed-loop antenna switching in E-UTRA uplink," LG Electronics, May 7, 2007, incorporated herein by reference. Specifically, the gains progressively decrease as $N_f$ increases. This is because the channel estimates used for antenna selection and frequency-domain scheduling rapidly become outdated.

Alternatives

Two techniques, namely, appropriate antenna selection criteria for outdated channel state information (CSI) and limited bandwidth frequency-domain scheduling, can be employed by the eNodeB along with a frequency-hopped SRS that properly account for the time dynamics of a frequency-hopped SRS.

Appropriate Antenna Selection Criteria for Outdated CSI

The schemes shown in FIGS. 3A-3B can lead to marginal improvement because of the outdated nature of the channel state information (CSI) that is not accounted for in antenna selection criteria. This is important for high values of $N_f$. Therefore, the eNodeB needs to predict the instantaneous channel value based on the outdated information available to improve the reliability of the joint frequency domain scheduling and antenna selection method.

One technique weighs the channel estimates based on the currency of the estimates, instead assuming that all estimates are perfect regardless of when the estimates were obtained.

Specifically, if a channel coefficient $h_{t-\Delta}$ obtained at time $t-\Delta$ is used for frequency scheduling and antenna selection at time t, we use $\hat{h}_t = \rho_\Delta h_{t-\Delta}$ as the estimate of the channel at time t where $$\rho_\Delta = \frac{E\{h_t h_{t-\Delta}^*\}}{E\{|h_t|^2\}}.$$

In effect, a greater weight is given to estimates more recent in time and a smaller weight is given to estimates that are less recent in time.

Further gains can be achieved if linear prediction with more than one estimate is used. For example, we can use a minimum mean-squared error (MMSE) method to obtain the channel estimates. Specifically, if $h_{t-\Delta}, h_{t-2\Delta}, \ldots, h_{t-N_p\Delta}$ are $N_p$ past estimates used for prediction at time t, then $$\hat{h}_t = \sum_{k=1}^{N_p} w_k h_{t-k\Delta},$$

where the weights $w_1, w_2, \ldots, w_{N_p}$ are selected to minimize the MSE $E\{|h_t-\hat{h}_t|^2\}$.

Limited/Variable Bandwidth Frequency-Domain Scheduling

One of the main objectives of the SRS is to facilitate frequency-domain scheduling for the UE. Instead of fully sounding the entire network bandwidth, the eNodeB can better utilize the additional spatial diversity made available by antenna selection by limiting the number of subbands each UE sounds.

This has the additional advantage of simplifying the task of assigning SRS patterns to different UEs. Specifically, the eNodeB makes each UE sound only a portion of an entire bandwidth available for the network. While this reduces the multi-user diversity gains, it improves the spatial diversity gains because the subband specific CSI about each antenna is obtained more often, and, therefore, is more accurate.

For example, we perform frequency-hopping SRS with the appropriate antenna selection criterion for $N_f=2$ and $N_f=5$. If the number of estimates used in the channel prediction process is 2, the channel gain is 1.2 dB compared to the gain of 2.2 dB when the entire bandwidth is sounded without any frequency hopping. Thus, antenna selection, when performed correctly can significantly increase performance.

Limited Bandwidth Frequency-Domain Scheduling

For partial bandwidth sounding, we consider a network with 25 UEs and a network bandwidth of 10 MHz. The users are divided into five sets of five users each. Each set of five users only sounds a 2 MHz bandwidth, instead of frequency-hopping over time to sound the entire 10 MHz bandwidth. For a Doppler shift of $f_d=30$ Hz, the bandwidth of the SRS results in a gain of around 2.0 dB when compared with no antenna selection.

It should be noted that sounding the entire bandwidth results in an additional gain of 0.2 dB because better frequency-domain scheduling is possible.

Effect of the Invention

The embodiments of the invention provide for antenna selection in the uplink of OFDM 3GPP wireless network between the transceiver and the eNodeB. Uplink transmit antenna selection delivers performance gains even with a variable bandwidth or frequency-hopped SRS.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for selecting antennas in a wireless network including a base station and one or more transceivers, comprising:
specifying, in a wireless network including a base station and a transceiver having a set of antennas, times, subcarriers and subsets of the set of antennas the transceiver is to use to transmit sounding reference signals (SRS) to the base station;
transmitting, by the transceiver, the SRS according to the specified times, subcarriers and the subsets of the antennas;
receiving the SRS in the base station;
estimating, by the base station for each different subset of the antennas, channel state information (CSI) from the SRS received by the base station from the corresponding subset of the antennas, wherein the base station has a plurality of CSI;
applying linear prediction and a minimum mean-squared error criterion to the plurality of CSI to obtain a current CSI;
selecting, in the base station, one of the subset of the antennas based on the received SRS and the current CSI; and
indicating the selected subset of the antennas to the transceiver.

2. A method of claim 1, further comprising:
labeling a most recently used subset of the antennas used for transmitting user data or control information from the transceiver to the base station as a selected subset of the antennas;
labeling all other antennas in the set of antennas as an unselected subset of the antennas;
transmitting, by the transceiver, the SRS using the selected subset of the antennas and the unselected subset of the antennas according to the specified times and subcarriers.

3. The method of claim 2, and further comprising:
signaling to the transceiver whether to use the selected subset of antennas or the unselected subset of antennas for transmission
signaling to the transceiver whether to use the selected subset of antennas or the unselected subset of antennas for transmission.

4. The method of claim 2, and further comprising:
transmitting the SRS i times using the selected subset of the antennas; and
transmitting the SRS j times using the unselected subset of the antennas, where i and j are different.

5. The method of claim 4, in which k=i+j, and j=1, where i, j, and k are positive integers.

6. The method of claim 5, and further comprising:
specifying k by the base station; and
indicating k to the transceiver.

7. The method of claim 5, in which k is 2, and further comprising:
transmitting the SRS alternatively by the selected subset of the antennas and the unselected subset of the antennas.

8. The method of claim 1, in which the transceiver has two antennas, and the SRS are transmitted alternately by the two antennas resulting in a time-interleaved frequency hopping pattern.

9. The method of claim 8, in which one of the two antennas is an unselected antenna.

10. The method of claim 1, in which the base station is an eNodeB.

11. The method of claim 1, and further comprising:
specifying the times and subcarriers according to a frequency hopping pattern.

12. The method of claim 11, in which the subcarriers for the frequency hopping pattern span only a portion of an entire available bandwidth of the network.

13. The method of claim 1, in which the transceiver is user equipment.

14. The method of claim 1, and further comprising:
enabling and disabling the transmitting implicitly.

15. The method of claim 1, and further comprising:
transmitting, by the transceiver, user data using the selected subset of the antennas.

16. The method of claim 1, further comprising:
transmitting, by the transceiver, control signals using the selected subset of the antennas.

17. The method of claim 1, in which the times and the subcarriers are specified according to a frequency hopping pattern, and in which the resource block for the selected subset of the antennas overlaps the resource block for the unselected subset of the antennas transmit within the frequency hopping pattern.

18. The method of claim 1, in which the base station adjusts the frequency hopping pattern to reduce a sounding interval of the resource block.

* * * * *